(12) United States Patent
Gretzer et al.

(10) Patent No.: US 12,620,607 B2
(45) Date of Patent: May 5, 2026

(54) BIPOLAR PLATE WITH INSERTABLE DIAPHRAGM AND FUEL CELL STACK

(71) Applicant: AUDI AG, Ingolstadt (DE)

(72) Inventors: Markus Gretzer, Eichstätt (DE); Norbert Kluy, Schönfeld (DE)

(73) Assignee: AUDI AG, Ingolstadt (DE)

( * ) Notice: Subject to any disclaimer, the term of this patent is extended or adjusted under 35 U.S.C. 154(b) by 352 days.

(21) Appl. No.: 18/001,791

(22) PCT Filed: Oct. 25, 2021

(86) PCT No.: PCT/EP2021/079521
§ 371 (c)(1),
(2) Date: Dec. 14, 2022

(87) PCT Pub. No.: WO2022/090143
PCT Pub. Date: May 5, 2022

(65) Prior Publication Data
US 2023/0253579 A1     Aug. 10, 2023

(30) Foreign Application Priority Data
Oct. 30, 2020    (DE) .......................... 102020128562.0

(51) Int. Cl.
*H01M 8/0265*      (2016.01)
*H01M 8/0202*      (2016.01)
      (Continued)

(52) U.S. Cl.
CPC ....... *H01M 8/0265* (2013.01); *H01M 8/1004* (2013.01); *H01M 8/0202* (2013.01);
      (Continued)

(58) Field of Classification Search
CPC ......... H01M 8/04089; H01M 8/04388; H01M 8/04395; H01M 8/04402; H01M 8/0441;
      (Continued)

(56) References Cited

U.S. PATENT DOCUMENTS

2006/0134502 A1*   6/2006   Garceau .............. H01M 8/0263
                                    429/434

FOREIGN PATENT DOCUMENTS

CN      207690923 U     8/2018
DE    102014220682    *   4/2016
       (Continued)

OTHER PUBLICATIONS

Written Opinion of the International Searching Authority, mailed Feb. 28, 2022, for International Patent Application No. PCT/EP2021/079521. (5 pages).

*Primary Examiner* — Matthew W Van Oudenaren
(74) *Attorney, Agent, or Firm* — Seed Intellectual Property Law Group LLP

(57) ABSTRACT

A bipolar plate for a fuel cell comprises an active region and an edge region surrounding the active region, the edge region being associated to a first media guide fluidically connected to a first passage and a second media guide fluidically connected to a second passage, as well as having a media duct which runs through the active region and fluidically connects the first passage to the second passage. At least one of the media guides comprises a first partial chamber and a second partial chamber having the passage. A flow cross-section of the media guide is tapered between the first partial chamber and the second partial chamber, and a diaphragm can be inserted or is inserted into the second partial chamber.

10 Claims, 1 Drawing Sheet

(51) Int. Cl.

| | | |
|---|---|---|
| *H01M 8/0258* | (2016.01) | |
| *H01M 8/0267* | (2016.01) | |
| *H01M 8/04089* | (2016.01) | |
| *H01M 8/04746* | (2016.01) | |
| *H01M 8/10* | (2016.01) | |
| *H01M 8/1004* | (2016.01) | |
| *H01M 8/2483* | (2016.01) | |

(52) U.S. Cl.
CPC ........ *H01M 8/0258* (2013.01); *H01M 8/0267* (2013.01); *H01M 8/04089* (2013.01); *H01M 8/04753* (2013.01); *H01M 8/04761* (2013.01); *H01M 8/04768* (2013.01); *H01M 2008/1095* (2013.01); *H01M 8/2483* (2016.02)

(58) Field of Classification Search
CPC ......... H01M 8/04447; H01M 8/04455; H01M 8/04462; H01M 8/0447; H01M 8/04753; H01M 8/04761; H01M 8/04798; H01M 8/04805; H01M 8/2483
See application file for complete search history.

(56) References Cited

FOREIGN PATENT DOCUMENTS

| | | | |
|---|---|---|---|
| DE | 102014220682 | A1 | 4/2016 |
| DE | 102016225444 | A1 | 6/2018 |
| EP | 1796196 | A2 | 6/2007 |
| EP | 3336949 | A1 | 6/2018 |
| ES | 2640047 | T3 | 10/2017 |

* cited by examiner

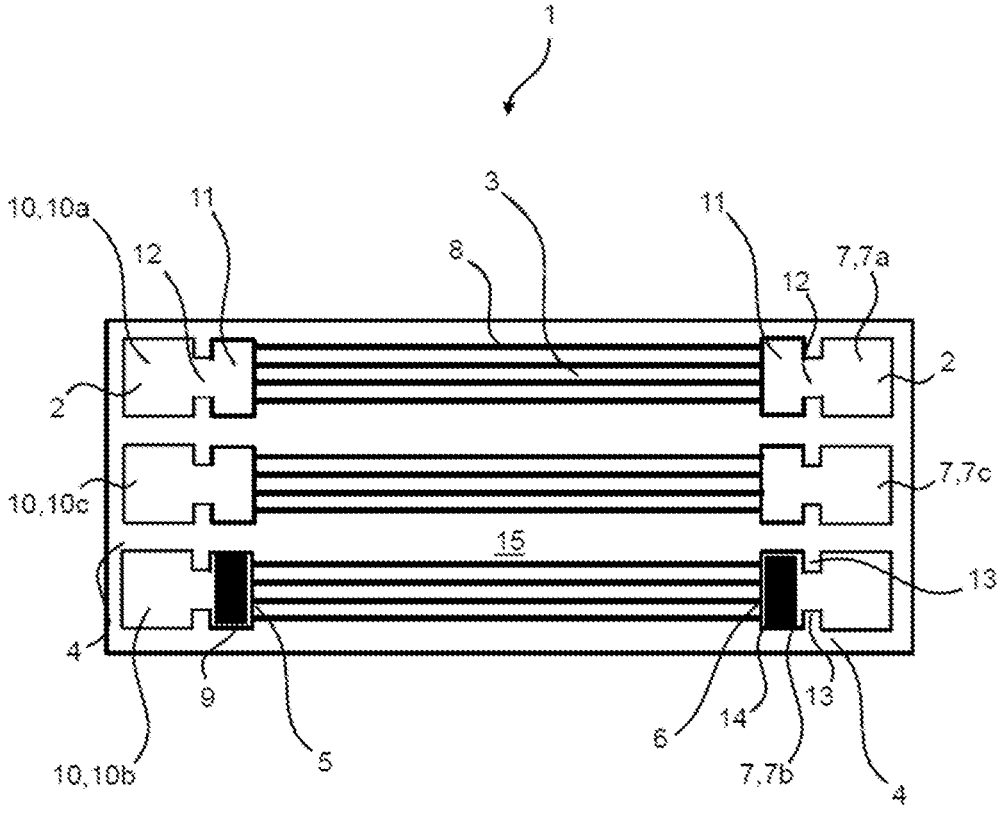

BIPOLAR PLATE WITH INSERTABLE DIAPHRAGM AND FUEL CELL STACK

BACKGROUND

Technical Field

Embodiments of the invention relate to a bipolar plate for a fuel cell having an active region and an edge region surrounding the active region, the edge region being associated to a first media guide comprising a first passage and a second media guide comprising a second passage. Further, a media channel extending through the active region and fluidically connecting the first passage to the second passage is provided.

Embodiments of the invention further relate to a fuel cell stack having at least one bipolar plate.

Description of the Related Art

Fuel cell devices are used for the chemical conversion of a fuel with oxygen to water in order to generate electrical energy. For this purpose, fuel cells contain a so-called membrane electrode assembly (MEA) as a core component, which membrane electrode assembly is a composite of a proton-conducting membrane and an electrode (anode and cathode) arranged on both sides of the membrane. In addition, gas diffusion layers (GDL) can be arranged on both sides of the membrane electrode assembly on the sides of the electrodes facing away from the membrane. During operation of the fuel cell device with a plurality of fuel cells combined to form a fuel cell stack, the fuel, in particular hydrogen $H_2$ or a hydrogen-containing gas mixture, is supplied to the anode, where an electrochemical oxidation from $H_2$ to $H^+$ takes place with the release of electrons. A transport of the protons $H^+$ from the anode compartment to the cathode compartment takes place via the electrolyte or the membrane, which separates the reaction compartments in a gas-tight manner and electrically insulates them. The electrons provided at the anode are fed to the cathode by means of an electrical line. Oxygen or an oxygen-containing gas mixture is fed to the cathode so that a reduction from $O^2$ to $O^{2-}$ takes place with absorption of the electrons. At the same time, these oxygen anions react in the cathode compartment with the protons transported across the membrane forming water.

The reactant gases are fed to the electrodes of the fuel cells by means of bipolar plates. In addition to the reactant gases, a cooling medium is also passed through the bipolar plates, so that three different media are passed through the bipolar plates in the smallest of spaces.

In order to fulfill high performance requirements, a plurality of fuel cells are combined or alternatively stacked on top of each other to form a fuel cell stack. In this, the media guide can be designed as media ports formed as recesses in the edge region, which give rise to a plurality of three-dimensional spaces when the individual layers of the fuel cell stack are stacked on top of each other. Alternatively, the media guide can also be formed as a functional component associated with the edge region of the bipolar plates and the fuel cells, and formed separately therefrom, in which a three-dimensional space is formed. In other words, an external heater may be associated with the fuel cells and bipolar plates stacked on top of each other. In this manner, a plurality of three-dimensional spaces are formed along the stacking direction for the supply of the reactants and the cooling medium into the active region of the fuel cells, and a plurality of three-dimensional spaces are formed along the stacking direction for the discharge of the reactants and the products as well as the cooling medium. Typically, a channel structure of media channels is formed by means of the active region of the bipolar plate, which channel structure fluidically connects one of the media guides, such as a media port, to another of the media guides. At least one passage is realized in the bipolar plate body of the bipolar plate, which passage fluidically connects the media guide, for example the media port, with the media channel(s).

In this, the efficiency of the fuel cell is significantly influenced by the media mass flow that flows through the media channels. This is determined to a considerable extent by the choice of the flow cross-section, which is to say, the diameter of the passage, which is defined when the bipolar plate is manufactured. The choice of diameter represents a compromise between different requirements for humidification and power output of the fuel cell. This makes it difficult to quickly adjust the power profile of the fuel cell stack during operation.

Moreover, a uniform distribution of reactants within a fuel cell stack is desired in order to optimally supply all fuel cells with humidity and fuel. For this purpose, in DE 10 2014 22 06 82 A1 a bipolar plate with a plurality of media ports, which form a manifold, is described, wherein an insert element can be deployed in the manifold. This insert element changes the cross-section of the manifold in sections in order to supply each of the fuel cells within the fuel cell stack with the same volume flow of media. DE 10 2016 225 444 A1 moreover describes a separator plate with a plurality of media ports, which form a manifold, into each of which an insert element can be inserted, wherein the insert element has a plurality of recesses. This too allows for the cross-section of the manifold to be adapted to the various fuel cells. CN 207 690 923 U likewise describes a bipolar plate with a media inlet channel in which an insert element is arranged.

The disadvantage here is that the cross-sectional shape of the insert element must either be adapted to the cross-sectional shape of the media ports, which leads to high material consumption, or a separate guide must be present for the insert element. This increases the material consumption as well as the number of manufacturing steps for the bipolar plate and thereby also for the fuel cell stack.

BRIEF SUMMARY

Some embodiments provide a bipolar plate and a fuel cell stack in which the above-mentioned disadvantages are reduced.

The bipolar plate is characterized in that at least one of the media guides comprises a first partial chamber and a second partial chamber having the passage, in that a flow cross section of the media guide is tapered between the first partial chamber and the second partial chamber, and in that a diaphragm can be inserted or is inserted into the second partial chamber. The second partial chamber of the media guide thus serves to receive and guide the diaphragm. An additional guide element or an additional guide for the diaphragm can thus be dispensed with. This reduces material consumption and simplifies the manufacture of the bipolar plate.

In particular, the diaphragm may be adjustably mounted by means of an actuator within the second partial chamber, for the purpose of adjustment of a flow cross section of the passage. The diaphragm is thus not only guided in the second partial chamber, but can be adjusted within the second partial chamber, so that an at least partial coverage of the passage and a reduction of the flow cross-section can be achieved. The diaphragm, which can be adjusted by means of the actuator, thereby enables dynamic adjustment of the flow cross-section at the passage, which in turn regulates the mass flows in the media channel as required. In this, the diaphragm may be adjustable between a first position, in which the passage is at least partially covered and wherein the flow cross-section is consequentially reduced, and a second position, in which the passage is uncovered. The diaphragm can also be adjusted by the actuator in such a manner that the passage is completely covered by the diaphragm, so that a mass flow of media through the passage into the media channel is prevented. This rapid reduction of the media supply leads to a situation where only the media that is found within the active region is available for the electrochemical reaction. This allows a rapid reduction in the provision of electrical power of the fuel cell stack in order to be able to react to dynamic processes in vehicles, for example the intervention of an antilock braking system. Conversely, a rapid increase in power can also be realized, or the media guide can be adapted to the power requirement in such a way that media consumption is optimized. By assigning a diaphragm to the second passage, which diaphragm can be controlled by means of the actuator, it is also possible to dynamically control the humidity balance of the fuel cell stack.

The diaphragm can be arranged in front of the passage or in the passage.

In this, the diaphragm can have the same cross-sectional shape as the first passage and/or the second passage, and the diaphragm may be configured to be elliptical. This allows easy manufacture and a good coverage of the passage. In an alternative embodiment, it is possible that the cross-sectional shape of the diaphragm is polygonal, which is to say, by way of example, rectangular, square, hexagonal, orthogonal or triangular. Moreover, the diaphragm may also be formed curved in the direction of the passage or against the passage.

In this, the diaphragm can have the same cross-sectional shape as the first passage and/or the second passage, and the diaphragm may be configured to be elliptical. This allows easy manufacture and good coverage of the passage.

In this context, the diaphragm may be mounted within the second partial chamber in a displaceable manner by an actuator, which is to say, in a translatable manner, for the purpose of adjustment of a flow cross-section of the passage.

Alternatively, the diaphragm may be rotatably mounted on or in the passage.

Furthermore, it is useful if the cross-sectional area of the second partial chamber closely corresponds to the cross-sectional area of the diaphragm. This enables optimum guidance of the diaphragm within the second partial chamber. Moreover, the diaphragm or the second partial chamber can also be assigned sealing lips for sealing the second partial chamber against the medium.

In order to achieve ease of manufacture of the bipolar plate, the tapered flow cross-section between the first partial chamber and the second partial chamber may be formed by at least one protruding projection. The projection is thus formed as part of the bipolar plate and can be formed in the same manufacturing step as the bipolar plate. In other words, no additional manufacturing steps are required to form the second partial chamber and the first partial chamber. This reduces the complexity of the component and reduces the material requirements, so that a cost reduction is achieved.

Moreover, the tapered flow cross-section between the first partial chamber and the second partial chamber may be formed by two opposing protruding projections. This leads to a symmetrical formation of the media guide and reduces the complexity of the bipolar plate.

In particular, the projection may form a guide rail for the diaphragm. Furthermore, both projections may form a guide rail for the diaphragm.

For simple regulation of the humidity content within a fuel cell, the other of the media guides may also comprise a first partial chamber and a second partial chamber comprising the passage, if a flow cross section of the media guide is tapered between the first partial chamber and the second partial chamber, and if a second diaphragm can be inserted or is inserted into the second partial chamber.

In this context, it is useful if the second diaphragm is adjustably mounted by means of an actuator within the second partial chamber for the purpose of adjustment of a flow cross-section of the passage. This enables the guidance of the media and also the adjustment of the media mass flow through the other media guide. In this, the second diaphragm can also be mounted in a displaceable manner, which is to say, in a translatable manner, by means of the actuator within the second partial chamber. Moreover, the taper of the other media guide may be formed by at least one projection protruding between the first partial chamber and the second partial chamber. Or is formed by two opposite protruding projections. The described embodiments of the diaphragm also apply to the second diaphragm.

It is moreover possible that the cross-sectional area of the second partial chamber of the first media guide differs from the cross-sectional area of the second partial chamber of the second media guide. Alternatively or additionally, the cross-sectional area of the entire first media guide may differ from the cross-sectional area of the second media guide. This too leads to an adjustment of the guidance of the medium through the formation of a pressure gradient.

The fuel cell stack is, in particular, characterized in that a plurality of fuel cells stacked one on top of the other in a stacking direction is provided, which fuel cell stack has at least one bipolar plate and one membrane electrode arrangement. The stacks of the fuel cells and of the bipolar plates form a media space extending in the stacking direction. Similarly, the stacked second partial chambers also form a three-dimensional space into which the diaphragm is inserted or insertable to match the flow cross-section of the passage. The diaphragm may be adjustably mounted in or against the stacking direction, this enables a dynamic adjustment of the flow cross-section of the passage and thereby a dynamic adjustment of the media mass flow. The advantages and embodiments described for the bipolar plate also apply analogously for the fuel cell stack with at least one bipolar plate.

The features and combinations of features mentioned above in the description as well as the features and combinations of features mentioned below in the description of the figures and/or shown alone in the FIGURE can be used not only in the respective combination indicated, but also in other combinations or on their own. Thus, embodiments are also to be regarded as encompassed and disclosed which are not explicitly shown or elucidated in the FIGURE, but which arise and can be generated by separate combinations of features from the elucidated embodiments.

BRIEF DESCRIPTION OF THE SEVERAL VIEWS OF THE DRAWINGS

Further advantages, features and details will be apparent from the claims, the following description of embodiments and from the drawing.

FIG. 1 shows a schematic representation of a bipolar plate.

DETAILED DESCRIPTION

FIG. 1 shows a bipolar plate 1 for a fuel cell with an active region 3 and an edge region 4 surrounding the active region 3. The edge region 4 has three first media guides 10 formed as first media ports, namely one media port for the supply of the first reactant 10a, one media port for the supply of the second reactant 10b and one media port for the supply of the coolant 10c into the active region 3 of the bipolar plate 1. Moreover, three second media guides 7 formed as second media ports are provided, namely one media port 7a for the discharge of the first reactant, one media port 7b for the discharge of the second reactant and one media port 7c for the discharge of the coolant. There are media channels 8 running through the active region 3 between the first media guide 10 and the second media guide 7, each respective channel forming a flow field for the corresponding operating medium.

The first media guides 10 have a plurality of first passages 5. The second media guides 7 have a plurality of second passages 6. A plurality of media channels 8 are moreover formed, which channels extend through the active region 3 of the bipolar plate 1. The media channels 8 fluidically connect the first passages 5 of the first media guides 10 to the second passages 6 of the respective second media guides 7. The media channels 8 are shown in simplified form in FIG. 1. Thus, the media channels 8 may be formed as a media channel network, which may run in a meandering manner through the active region 3 of the bipolar plate 1. In particular, the media channels 8 extend in an open-ended manner on one side in order to supply the active regions of the layers adjacent to the bipolar plate 1 with the media. The first passages 5 and the second passages 6 are formed within a bipolar plate body 15, such that the passages 5, 6 tunnel under the bipolar plate 1.

The first media guides 10 have a first partial chamber 2 and a second partial chamber 11 comprising the passage 5. The flow cross-section of the first media guide 10 is tapered between the first partial chamber 2 and the second partial chamber 11. In other words, a media guide channel 12 with a reduced flow cross-section is arranged between the first partial chamber 2 and the second partial chamber 11. A diaphragm 9 is insertable or inserted into the second partial chamber 11. The diaphragm 9 is displaceably mounted within the second partial chamber 11 by means of an actuator, so that by displacement of the diaphragm 9, the flow cross-section of the passages 5 can be adjusted. The cross-sectional area of the second partial chamber 11 thereby corresponds approximately to the cross-sectional area of the diaphragm 9, so that an increased contact area of the diaphragm 9 with the passage 5 is accomplished in order to achieve a corresponding media seal.

For an easier manufacture of the bipolar plate 1, the media guide channels 12, or the tapered flow cross-section between the first partial chamber 2 and the second partial chamber 11, are formed by two opposing protruding projections 13, which for sake of clarity is indicated in only one of the two media guides 7. The projections 13 are thus formed in the bipolar plate body 15 itself. The two partial chambers 2, 11 and the media guide channel 12 of the respective media guides 10, 7 can thus be manufactured in a single production step. The projections 13 thereby form a guide rail for the diaphragm 9 so that it can be moved along the second partial chamber 11 without additional guide or fixing elements.

The embodiment example of FIG. 1 moreover shows that at least one of the second media guides 7 also comprises a first partial chamber 2 and a second partial chamber 11 that has the passage 6. The flow cross-section of the second media guide 7 is tapered between the first partial chamber 2 and the second partial chamber 11. A second diaphragm 14 can also be inserted or is inserted into the second partial chamber. The second diaphragm 14 is also adjustable by means of an actuator inside the second partial chamber 11, in particular displaceably mounted, in order to be able to adjust the flow cross section of the passage 6. A diaphragm 9 may be inserted in all second partial chambers 11 of the first media guide 10 and said diaphragm may be adjustable by means of an actuator. It is possible that a diaphragm 14 is additionally inserted in all second partial chambers 11 of the second media guide 10, which diaphragm is adjustable by means of an actuator.

In the embodiment according to FIG. 1, the cross-sectional area of the second partial chambers 11 of the first media guide 10 corresponds to the cross-sectional area of the second partial chambers 11 of the second media guide 7. In an alternative embodiment example, the cross-sectional areas of the second partial chambers 11 can also however differ, which leads to an additional adjustment option for the media supply and media discharge.

The bipolar plate 1 described in FIG. 1 can be integrated into a fuel cell stack comprising a plurality of fuel cells stacked one above the other in a stacking direction. For this purpose, a membrane electrode arrangement is placed between each two such bipolar plates 1 in order to supply them with reactants via the flow fields of the bipolar plates 1. This stacking creates a media space running essentially parallel to the stacking direction. The media space forms a three-dimensional second partial chamber 11 extending in the stacking direction, into which a common diaphragm 9, 14 is inserted and is adjustably mounted. This enables dynamic guidance and control of the media within the fuel cell stack.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate for a fuel cell, comprising:
an active region;
an edge region surrounding the active region, the edge region being associated to a first media guide fluidically connected to a first passage and a second media guide fluidically connected to a second passage;
a media duct which runs through the active region and fluidically connects the first passage to the second passage,
wherein at least one of the first and second media guides comprises a first partial chamber and a second partial chamber having the first passage or the second passage, respectively,
wherein a media guide channel is provided between the first partial chamber and the second partial chamber,
wherein a flow cross-section of the media guide is reduced at the media guide channel provided between the first partial chamber and the second partial chamber such that a flow cross-section of the media guide channel is smaller than a flow cross-section of the first partial chamber adjacent to the media guide channel and smaller than a flow cross-section of the second partial chamber adjacent to the media guide channel, and wherein the second partial chamber is configured to receive a diaphragm or the diaphragm is inserted into the second partial chamber.

2. The bipolar plate according to claim 1, wherein the diaphragm is inserted into the second partial chamber, and wherein the diaphragm is adjustably mounted by an actuator within the second partial chamber for adjustment of a flow cross-section of the first passage or the second passage.

3. The bipolar plate according to claim 1, wherein the diaphragm is inserted into the second partial chamber, and wherein the diaphragm is displaceably mounted by an actuator within the second partial chamber for adjustment of a flow cross-section of the first passage or the second passage.

4. The bipolar plate according to claim 1, wherein the reduced flow cross-section of the media guide at the media guide channel between the first partial chamber and the second partial chamber is formed by at least one protruding projection.

5. The bipolar plate according to claim 1, wherein the reduced flow cross-section of the media guide at the media guide channel between the first partial chamber and the second partial chamber is formed by two opposing protruding projections.

6. The bipolar plate according to claim 4, wherein the at least one protruding projection forms a guide rail for the diaphragm.

7. The bipolar plate according to claim 1, wherein the other one of the first and second media guides also comprises a first partial chamber and a second partial chamber having the first passage or the second passage, respectively, wherein a media guide channel is provided between the first partial chamber and the second partial chamber, wherein a flow cross-section of the media guide is reduced at the media guide channel provided between the first partial chamber and the second partial chamber such that a flow cross-section of the media guide channel is smaller than a flow cross-section of the first partial chamber adjacent to the media guide channel and smaller than a flow cross-section of the second partial chamber adjacent to the media guide channel, and wherein the second partial chamber is configured to receive a second diaphragm or the second diaphragm is inserted into the second partial chamber.

8. The bipolar plate according to claim 7, wherein the second diaphragm is inserted into the second partial chamber of the other one of the first and second media guides, and wherein the second diaphragm is adjustably mounted by an actuator within the second partial chamber for the purpose of adjustment of a flow cross-section of the first passage or the second passage.

9. The bipolar plate according to claim 7, wherein a cross-sectional area of the second partial chamber of the first media guide is different from a cross-sectional area of the second partial chamber of the second media guide.

10. A fuel cell stack formed of a plurality of fuel cells stacked on top of each other in a stacking direction, comprising at least one bipolar plate according to claim 1 and a membrane electrode assembly.

* * * * *